(12) United States Patent
Baek

(10) Patent No.: US 11,086,037 B2
(45) Date of Patent: Aug. 10, 2021

(54) SYSTEM AND METHOD OF SURFACE CONSISTENT PROCESSING

(71) Applicant: Saudi Arabian Oil Company, Dhahran (SA)

(72) Inventor: Hyoungsu Baek, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 77 days.

(21) Appl. No.: 16/460,733

(22) Filed: Jul. 2, 2019

(65) Prior Publication Data

US 2020/0003921 A1    Jan. 2, 2020

Related U.S. Application Data

(60) Provisional application No. 62/693,206, filed on Jul. 2, 2018.

(51) Int. Cl.
| | | |
|---|---|---|
| *G01V 1/36* | (2006.01) | |
| *G01V 1/30* | (2006.01) | |
| *G01V 1/34* | (2006.01) | |

(52) U.S. Cl.
CPC ............... *G01V 1/307* (2013.01); *G01V 1/34* (2013.01); *G01V 1/36* (2013.01)

(58) Field of Classification Search
CPC .......... G01V 1/307; G01V 1/362; G01V 1/36; G01V 1/28
See application file for complete search history.

(56) References Cited

U.S. PATENT DOCUMENTS

| | | | | |
|---|---|---|---|---|
| 5,173,879 A | * | 12/1992 | Cung | ..................... G01V 1/366 367/21 |
| 2013/0176820 A1 | | 7/2013 | Le Meur et al. | |
| 2013/0315003 A1 | | 11/2013 | Krohn | |

FOREIGN PATENT DOCUMENTS

| | | | | |
|---|---|---|---|---|
| GB | 2385435 A | * | 8/2003 | ............... G01V 1/36 |
| WO | WO 2016075538 | | 5/2016 | |

OTHER PUBLICATIONS

Almutlaq et al., Surface-Consistent Matching Filters for Time-Lapse Seismic Processing, 2012, CREWES Research Report, vol. 24, 22 pp. (Year: 2012).*
GB 2385435 A, Aug. 20, 2003, 17 pp. (Year: 2003).*
Google Search Results, Dec. 30, 2020, 2 pp. (Year: 2020).*
One Petro Search Results, May 24, 2021, 4 pp. (Year: 2021).*

(Continued)

*Primary Examiner* — Toan M Le
(74) *Attorney, Agent, or Firm* — Fish & Richardson P.C.

(57) ABSTRACT

Methods, systems, and computer-readable medium to perform operations including obtaining, for a plurality of traces, seismic signal amplitude data associated with a plurality of sources and receivers; determining that the signal amplitude data includes at least a receiver key and a source key; in response to the determining, generating a receiver group key and a source group key; assigning a respective weight to each of the receiver key, the source key, the receiver group key, and the source group key; and generating surface-consistent amplitude data using the constrained linear system of equations and each scaling factor of the weighted-receiver key, the weighted-source key, the weighted-receiver group key, and the weighted-source group key.

16 Claims, 10 Drawing Sheets

(56) References Cited

OTHER PUBLICATIONS

Cambois and Stoffa, "Surface consistent deconvolution in the log/Fourier domain," Geophysics vol. 57, No. 6, Jun. 1992, 18 pages.
Cary, "Questioning the basics of surface-consistent scaling," SEG Houston 2013 meeting, 5 pages.
Garceran, "Data-constrained surface-consistent amplitude corrections," 75th EAGE Conference & Exhibition incorporating SPE EUROPEC 2013, London, Jun. 10-13, 2013, 4 pages.
Millar and Bancroft, "Long wavelength solutions to the surface consistent equations," SEG Technical Program Expanded Abstracts, 2006, 17 pages.
Taner and Koehler, "Surface consistent corrections," Geophysics vol. 46, No. 1, Jan. 1981, 6 pages.
Vossen et al., "Surface consistent deconfolution using reciprocity and waveform inversions," Geophysics, vol. 71, No. 2, Mar.-Apr. 2006, 11 pages.
"Cary et al, ""Four-Component Surface-Consistent Deconvolution"", Geophysics, Society of Exploration Geophysicists, US, vol. 58, No. 3, Mar. 1993, pp. 383-392, 10 pages."
PCT International Search Report and Written Opinion in International Appln. No. PCT/US2019/040108, dated Sep. 27, 2019, 18 pages.
GCC Examination Report in Gulf Cooperation Council Appln. No. GC 2019-37875, dated May 9, 2021, 5 pages.

\* cited by examiner

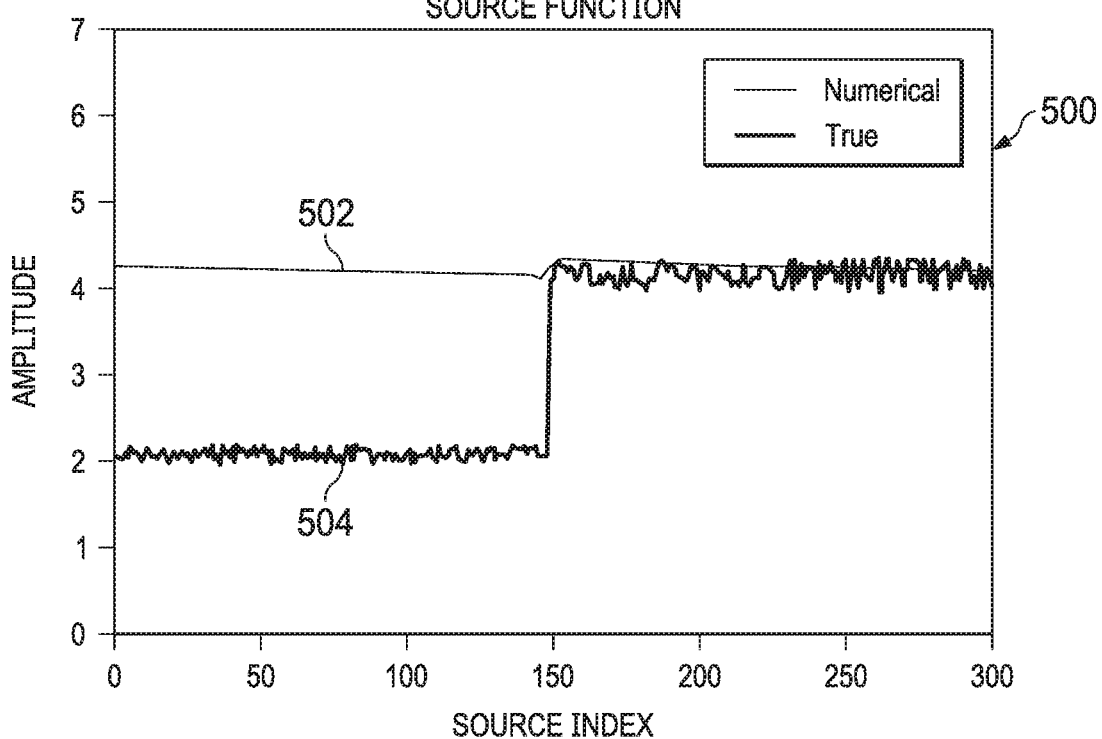
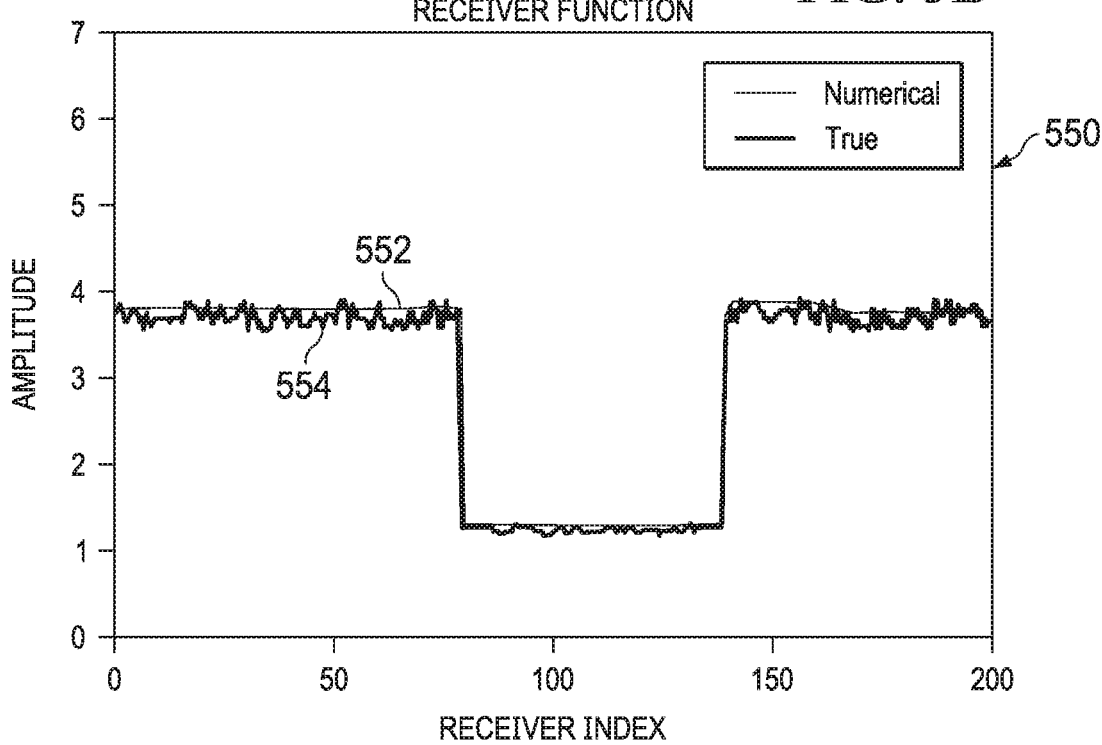

SYSTEM AND METHOD OF SURFACE CONSISTENT PROCESSING

CROSS-REFERENCE TO RELATED PATENT APPLICATIONS

This application claims the benefit of priority to U.S. Provisional Application Ser. No. 62/693,206, filed on Jul. 2, 2018, the contents of which are hereby incorporated by reference.

TECHNICAL FIELD

This disclosure relates to surface consistent processing of seismic data.

BACKGROUND

Surface-consistent processing of seismic data involves simultaneous processing of large datasets, which creates challenges from a computational and data management perspective. Additionally, a linear system of a convolution modeling scheme can suffer from non-uniqueness. There is currently no consensus on a solution for mitigating the non-uniqueness and constraints of the system. One issue that is encountered when developing solutions is long-wavelength errors. These errors are observed when sources and receivers experience different coupling from one location to another in a survey area. These errors in surface consistent processing have not been addressed successfully.

SUMMARY

The present disclosure discusses surface-consistent processing that is used in seismic processing algorithms. For example, surface-consistent amplitude (SCA) analysis determines scaling factors that affect the root-mean-square (RMS) signal amplitude of seismic traces. Scaling factors can be identified using inversion by assuming that the RMS amplitude of the trace corresponding to the source i and the receiver j (that is, $RMS_{i,j}$) is a product of the source scaling factor $s_i$, the receiver scaling factor $r_j$, and the Greens function $g_{i,j}$ between the ith source and the jth receiver. However, when sources experience different coupling from one location to another, long wavelength errors are observed. To that end, incorporation of surface conditions into a linear system of equations can facilitate surface-consistent amplitude balancing with additional keys that can be applied to the seismic data.

Innovative aspects of the subject matter described in this disclosure may be embodied in methods that include the actions of obtaining, for a plurality of traces, seismic signal amplitude data associated with a plurality of sources and receivers; determining that the signal amplitude data includes at least a receiver key and a source key; in response to the determining, generating a receiver group key and a source group key; assigning a respective weight to each of the receiver key, the source key, the receiver group key, and the source group key; and generating surface-consistent amplitude data using surface-consistent amplitude processing and each scale factor of the weighted-receiver key, the weighted-source key, the weighted-receiver group key, and the weighted-source group key.

Other embodiments of these aspects include corresponding systems, apparatus, and computer programs, configured to perform the actions of the methods, encoded on computer storage devices.

These and other embodiments may each optionally include one or more of the following features. For instance, determining that the signal amplitude data includes a common-depth point key and an offset key. Assigning a respective weight to each of the common-depth point key and the offset key; and generating the surface consistent amplitude data using each scaling factor of the weighted-receiver key, the weighted-source key, the weighted-receiver group key, the weighted-source group key, the weighted-common-depth point key, and the weighted-offset key. Assigning each of the weights to each of the receiver key, the source key, the receiver group key, the source group key, the common-depth point key, and the offset key to balance an amplitude of the seismic data. The weight assigned to the source key is greater than the weight assigned to the source group key. The weight assigned to the receiver key is greater than the weight assigned to the receiver group key. Both of the weight assigned to the source group key and the weight assigned to the receiver group key is greater than the weight assigned to the offset key. Both of the weight assigned to the source group key and the weight assigned to the receiver group key is greater than the weight assigned to the common-depth point key. Grouping the sources into disjointed source groups; and generating the source group key based on source solutions without a group key or extra information such as source elevation, surface condition index, survey dates and so other available information. Grouping the receivers into disjointed receiver groups and generating the receiver group key as the source group key is generated.

Particular implementations of the subject matter described in this specification can be implemented so as to realize one or more of the following advantages. For example, implementation of the subject matter provides improved surface-consistent processing of seismic data, and reduction of long wavelength errors. More balanced seismic data leads to more accurate subsurface velocity models and seismic images with higher resolution. Predicting well locations and planning of drilling rely on interpretation of these seismic images.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

FIG. 5A illustrates a five key decomposition with respect to source functions, according to some implementations.

FIG. 5B illustrates a five key decomposition with respect to receiver functions, according to some implementations.

DETAILED DESCRIPTION

Figure 1:
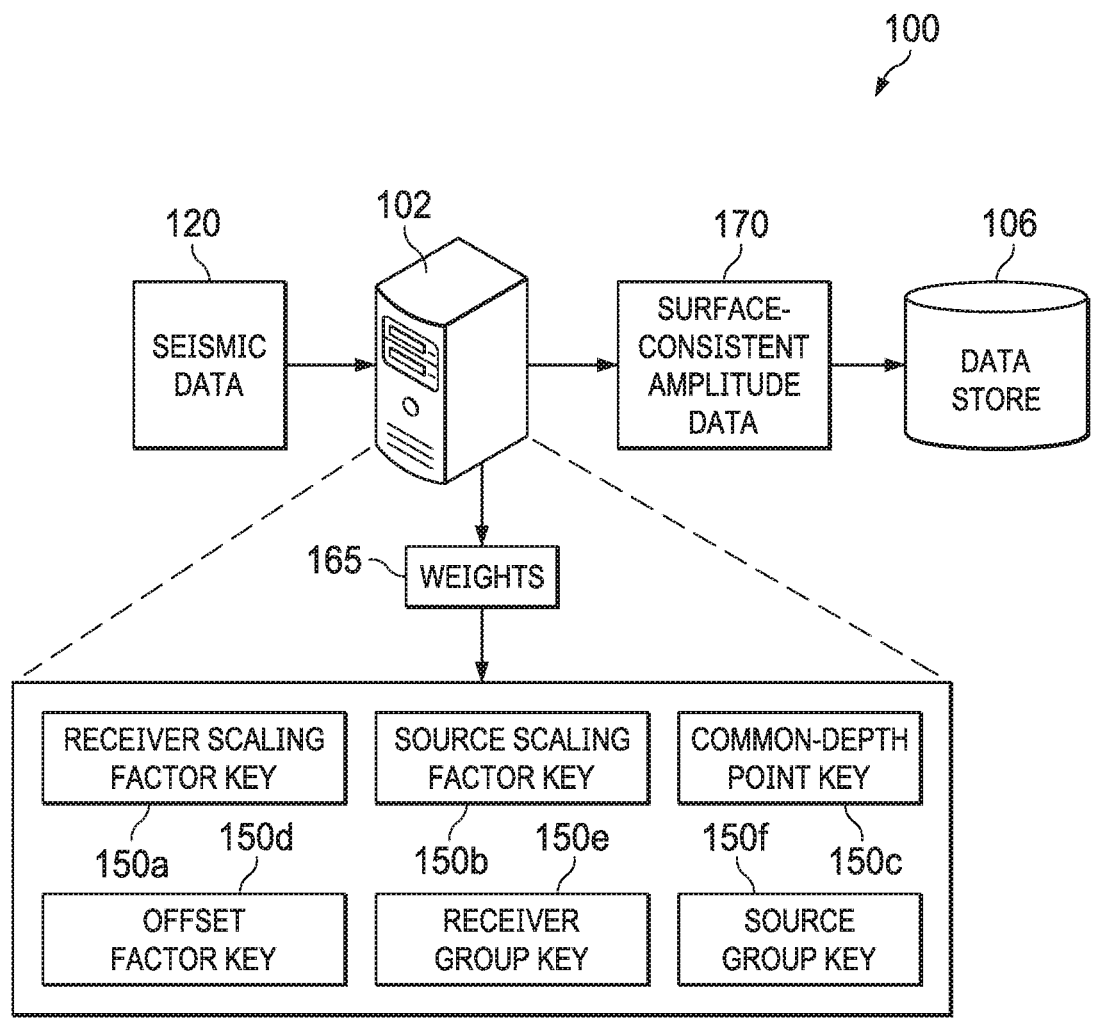
FIG. 1 is a schematic illustration of a system for surface consistent processing, according to some implementations.

The present disclosure describes a computing system 100 for surface consistent processing, shown in FIG. 1. The computing system 100 includes a computing device 102 that can be in communication with one or more other computing systems (not shown) over one or more networks (not shown). The system 100 further includes a data store 106, with the computing device 102 in communication with the data store 106.

In some implementations, the computing device 102, obtains, for a plurality of traces, seismic data 120 that is associated with a plurality of sources and receivers. In some examples, the seismic data 120 can include seismic signal amplitude data. The computing device 102 can analyze the seismic data 120 to determine that the seismic data 120 includes at least a receiver scaling factor key 150a, a source scaling factor key 150b, a common-depth point key 150c, and an offset factor key 150d. Specifically, in surface-consistent processing, the root-mean-square (RMS) amplitude of a trace corresponding to a source i and a receiver j can be expressed by Equation [1]:

$$RMS_{i,j} = s_i r_j g_{i,j};$$ [1]

where $s_i$, $r_j$, and $g_{i,j}$ are scaling factors associated with the ith source, jth receiver, and the Greens function between source i and receiver j, respectively.

The factor $g_{i,j}$ can be approximated by a decomposition into a common-depth point (CDP) and offset factors. As a result, the computing device 102 is able to increase redundancy (for example, improving inversion robustness) while reducing computational cost. The accuracy of the inverted scaling factors can depend on the validity of this approximation. Factors that are not captured by this approximation can have their effect incorporated into the chosen factors by averaging. Moreover, the log transform can be used to linearize the inversion of Equation [1].

In some examples, Equation [1] can be decomposed in a "four key" example with the factor $g_{i,j}$ decomposed into the CDP and offset components $c_{i,j}$ and $o_{i,j}$, respectively. This yields Equation [2]:

$$\ln RMS_{i,j} = \ln s_i + \ln r_j + \ln c_{i,j} + \ln o_{i,j}.$$ [2]

In some examples, the computing device 102 can replace the four log terms on the right hand side of Equation [2] with variables $S_i$, $R_j$, $C_{i,j}$, and $O_{i,j}$. This provides a system of linear equations equal to the number of traces. The properties of the resultant decomposition matrix (A) include:

Every row having the same number of 1's. The number of 1's is the number of used keys in the convolutional modeling.

The matrix A can be written as $[A_1|A_2|A_3|\ldots|A_n]$, where n is the number of keys. The number of columns in the submatrix $A_i$ equals the number of unique key values of the ith key, $n_i$.

The unknown vector $x=[x_1|x_2|\ldots|x_n]^T$, where $x_i = [x_1^i, x_2^i, \ldots, x_n^i]$. In some examples, $x_i$ is set equal to 1 to indicate that all elements of $x_i$ are 1, for example, $x_k^i = 1$, from k=1 to $n_i$.

The dimension of the null space of the matrix A is at least n−1. For $x_i = 1$, $A_i x_i = 1$. For any pair of subscripts i and j, (i≠j), $x_i = 1$ and $x_j = -1$ makes $A_i x_i + A_j x_j = 0$. Thus, $x=[0|\ldots|x_i|\ldots|x_j|\ldots 0]^T$ is a basis of the null space. Each pair in the set, $[(1,2), (1,3), \ldots, (1,n)]$, will make an independent null vector, totaling n−1 null vectors. As the number of keys increases, the dimension of the null space gets larger.

In some implementations, the computing device 102, in response to determining that the seismic data includes at least the receiver scaling factor key 150a, the source scaling factor key 150b, the common-depth point key 150c, and the offset factor key 150d, generates a receiver group key 150e, and a source group key 150f (for simplicity, the keys 150a, 150b, 150c, 150d, 150e, 150f can be referred to as keys 150). In short, the computing device 102 can group the sources and the receivers into clusters to facilitate generating the receiver group key 150e and the source group key 150f. In an example, the computing device 102 groups the sources and the receivers based on one or more measures, such as moisture, elevation, temperature, or a combination thereof. Specifically, the computing device 102 can replace the source term $s_i$ with $\tilde{s}g_{sk(i)}^s$, where $sk(i) \in K = \{1, 2, \ldots, N_g^s\}$. $N_g^s$ is the number of groups (clusters) of sources. In some examples, the number of groups of sources is smaller than the total number of sources. The integer sk(i) indicates the group to which the ith source belongs. The sources are grouped into $N_g^s$ disjointed groups, $G_1^s, G_2^s, \ldots, G_{N_g^s}^s$, where $G_1^s \cup G_2^s \cup \ldots \cup G_{N_g^s}^s = \{1, 2, 3, 4, \ldots, N_s\}$.

Similarly, the computing device 102 can replace the source term $r_i$ with $\tilde{r}g_{rk(i)}^r$, where $rk(i) \in K = \{1, 2, \ldots, N_g^r\}$. $N_g^r$ is the number of groups (clusters) of receivers. In some examples, the number of groups of receivers is smaller than the total number of receivers. The integer rk(i) indicates the group to which the ith receiver belongs. The receivers are grouped into $N_g^r$ disjointed groups, $G_1^r, G_2^r, \ldots, G_{N_g^r}^r$, where $G_1^r \cup G_2^r \cup \ldots \cup G_{N_g^r}^r = \{1, 2, 3, 4, \ldots, N_r\}$.

With these groups, the receiver function $r_j$ can be factorized similarly. Such representation of the sources and receivers is analogous to modeling a function with a linear combination of basis functions. In some examples, $\tilde{s}_i = 1$ and $\tilde{r}_j = 1$ such that the computing device 102 can implement piecewise constant basis functions for each group. To that end, the computing device 102 can adjust Equation [2] based on the grouping of the sources and receivers, as shown in Equation [3]:

$$\ln RMS_{i,j} = \ln \tilde{s}_i + \ln g_{sk(i)}^s + \ln \tilde{r}_j + \ln g_{sk(i)}^r \ln c_{i,j} + \ln o_{i,j}.$$ [3]

However, adding the additional group keys does not change the number of equations but does increase the number of unknowns by the total number of source and receiver groups, for example, $N_g^r + N_g^s$.

In some implementations, the computing device 102 adds a respective weight to each of the receiver scaling factor key 150a, the source scaling factor key 150b, the receiver group key 150e, the source group key 150f, the common-depth point key 150c, and the offset factor key 150d. Specifically, the computing device 102 adds constraints to the keys 150 to identify a solution. That is, each of the receiver scaling factor key 150a, the source scaling factor key 150b, the receiver group key 150e, the source group key 150f, the common-depth point key 150c, and the offset factor key 150d is adjusted (or penalized) by the computing device 102 with the weights $W_{src}$, $W_{cdp}$, $W_{rec}$, $W_{off}$, $W_{sgroup}$, and $W_{rgroup}$, respectively (shown as weights 165). Thus, the size, more specifically, the number of rows, of the augmented system of equations increases by the number of unknowns, $N_s + N_{cdp} + N_r + N_o + N_{sg} + N_{rg}$. In some examples, the individual receiver and source scaling factor keys 150a, 150b are less emphasized than the receiver and source group keys 150e, 150f. In some examples, the weights follow the guideline:

$W_{src} > W_{sgroup}$
$W_{rec} > W_{rgroup}$
$W_{off} < W_{sgroup}, W_{rgroup}$
$W_{cdp} < W_{sgroup}, W_{rgroup}$ In some examples, the computing device 102 adds the respective weights 165 to each of the receiver scaling factor key 150a, the source scaling factor key 150b, the receiver group key 150e, the source group key 150f, the common-depth point key 150c, and the offset factor key 150d to balance an amplitude of the seismic data 120. That is, when the seismic data 120 is balanced, discontinuity in the amplitude of the seismic data 120 is reduced or minimized. This facilitates reducing, or minimizing, the long wavelength errors that can occur when the sources and receivers experience different coupling from one location to another or experience discontinuities. The computing device 102 balances the amplitude of the seismic data 120 by adding weights 165 to constrain the linear systems in the surface-consistent processing of the seismic data 120, thereby mitigating the non-uniqueness and the long wavelength errors.

In some implementations, the computing device 102 generates surface-consistent amplitude data 170 using each scaling factor of the weighted-receiver scaling factor key 150a, the weighted-source scaling factor key 150b, the weighted-receiver group key 150e, the weighted-source group key 150f, the weighted-common-depth point key 150c, and the weighted-offset factor key 150d. Specifically, the computing device 102 generates the surface-consistent amplitude data 170 using a solution of constrained linear system of equations and each of the weighted-keys 150 to reduce, or remove, the source, the receiver, or both, effect on the seismic data 120. In an implementation, matrices are inverted with Conjugate Gradient Normal Residual (CGNR), which solves $A^T A x = A^T b$. For large scale problems, the computing device 102 can implement a surface-consistent processing framework that has been developed for surface-consistent amplitude balancing, deconvolution, and residual statics correction. Linear systems are augmented with constraints, with the computing device 102 solving the CGNR algorithm iteratively.

Figure 2A:
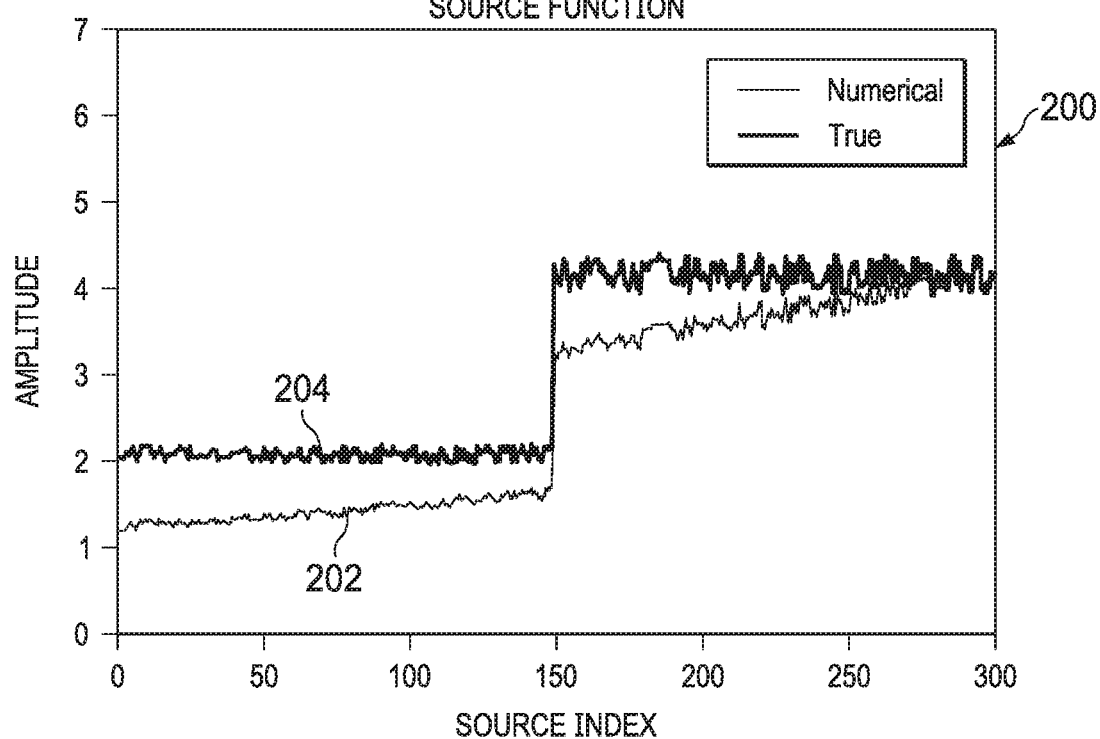
FIGS. 2A, 3A, 4A illustrate respective four key decompositions with respect to source functions, according to some implementations.
Figure 2B:
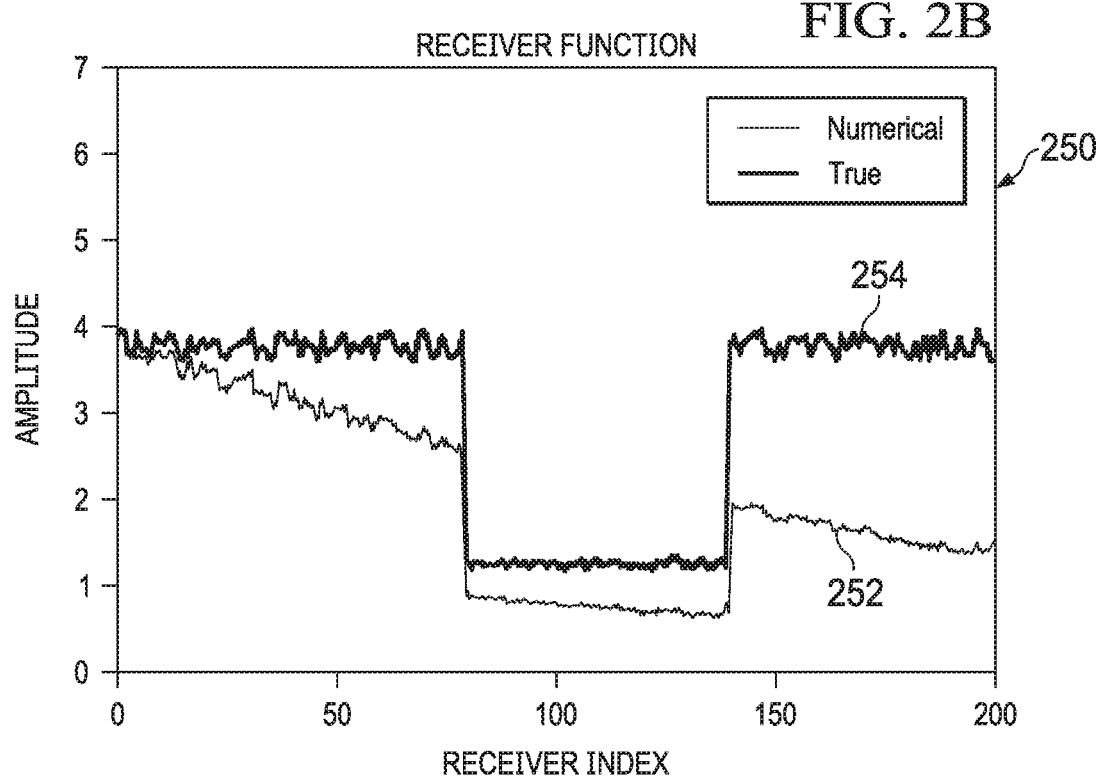
FIGS. 2B, 3B, 4B illustrate respective four key decompositions with respect to receiver functions, according to some implementations.

FIGS. 2-6 illustrate source and receiver solutions for different constraints and weights 165 on the keys 150, according to some implementations. Specifically, FIGS. 2-4 illustrate scenarios when four keys are used in the decomposition including the source scaling factor key 150b, the receiver scaling factor key 150a, the common-depth point key 150c, and the offset factor key 150d. FIGS. 2A, 2B illustrate a first example of a four key decomposition. Specifically, FIG. 2A illustrates a graph 200 of a comparison of the source functions between numerical solutions 202 (unbolded line) and true solutions 204 (bolded line) without any constraint; and FIG. 2B illustrates a graph 250 of a comparison of the receiver functions between numerical solutions 252 (unbolded line) and true solutions 254 (bolded line) without any constraint. That is, the weights 165 for each of the receiver scaling factor key 150a, the source scaling factor key 150b, the common-depth point key 150c, and the offset factor key 150d is zero.

Figure 3A:
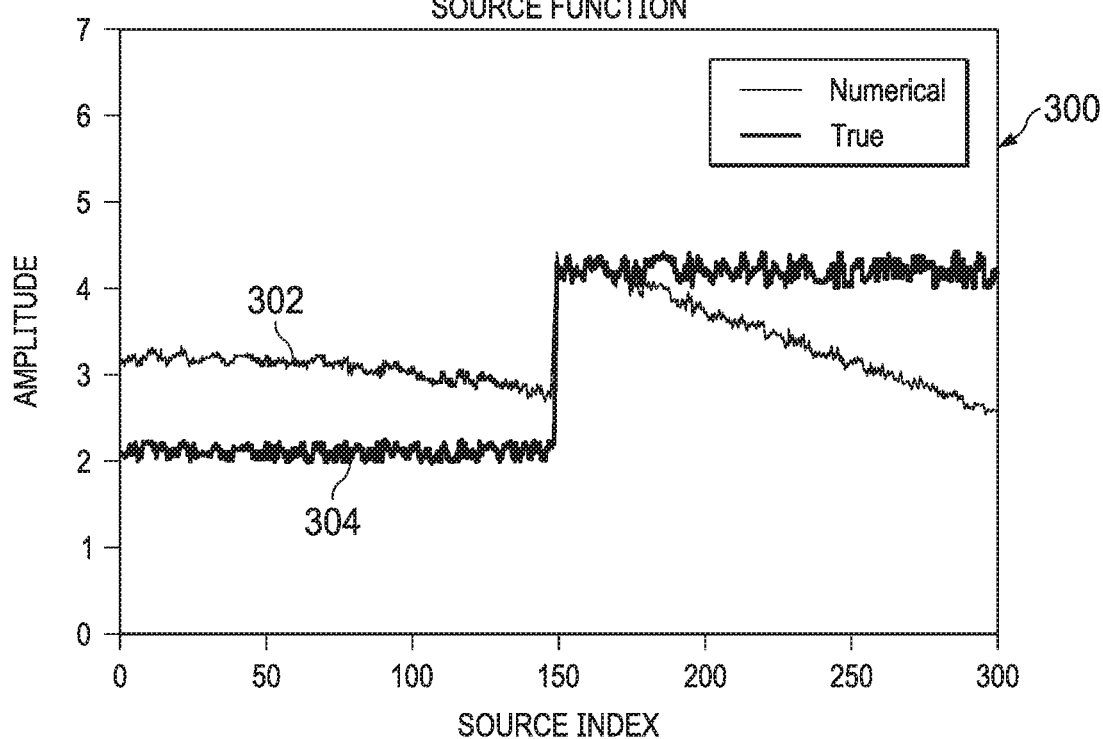
Figure 3B:
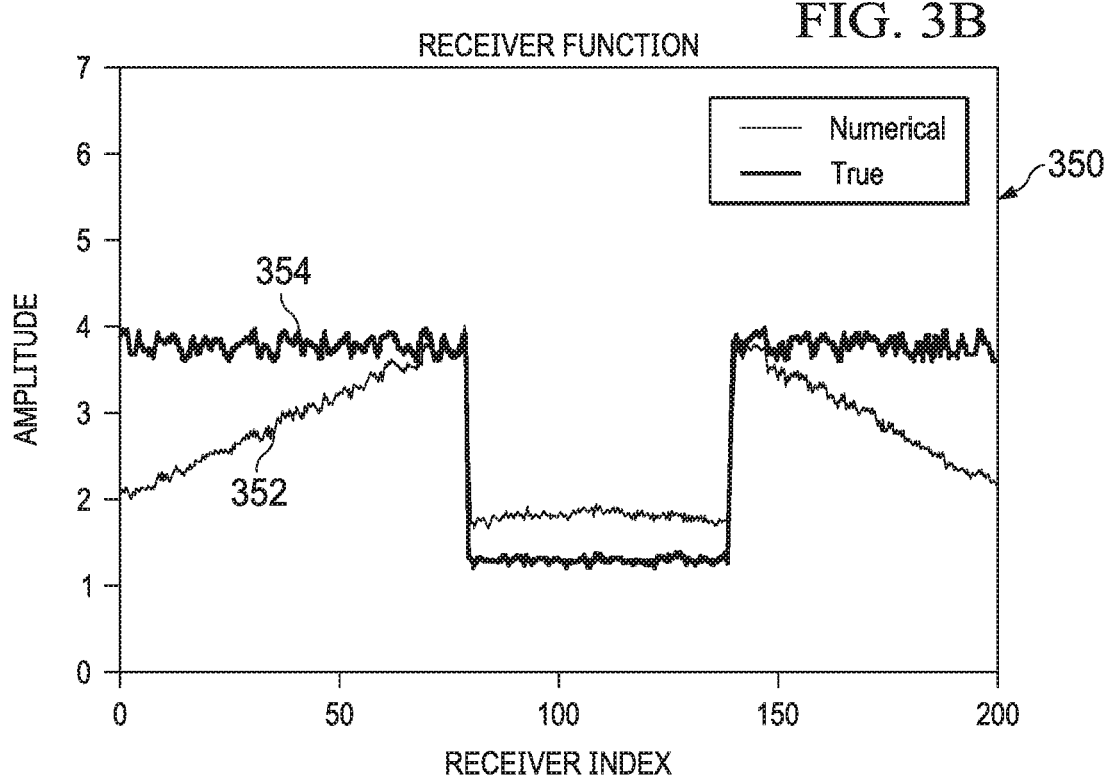

FIGS. 3A, 3B illustrate a second example of a four key decomposition. Specifically, FIG. 3A illustrates a graph 300 of a comparison of the source functions between numerical solutions 302 (unbolded line) and true solutions 304 (bolded line); and FIG. 3B illustrates a graph 350 of a comparison of the receiver functions between numerical solutions 352 (unbolded line) and true solutions 354 (bolded line) without any constraint. That is, the weight 165 for the receiver scaling factor key 150a is 10; the weight 165 for the source scaling factor key 150b is 10, the weight 165 for the common-depth point key 150c is 1e-3, and the weight 165 for the offset factor key 150d is 1e-3.

Figure 4A:
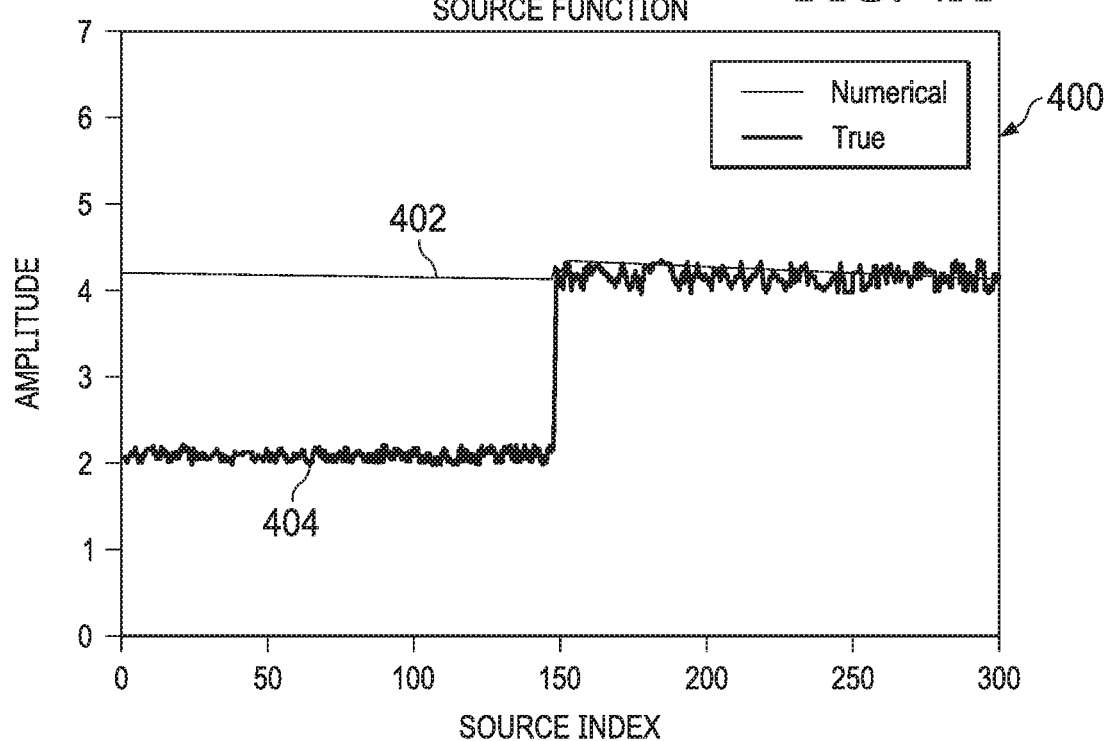
Figure 4B:
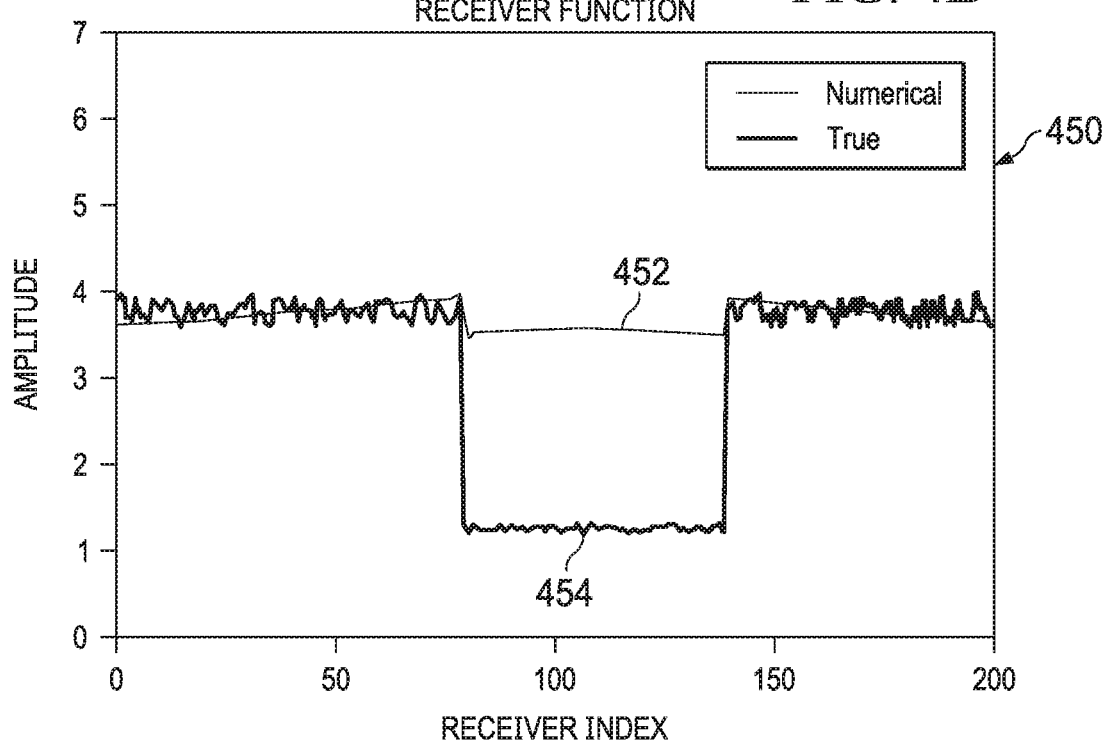

FIGS. 4A, 4B illustrate a third example of a four key decomposition. Specifically, FIG. 4A illustrates a graph 400 of a comparison of the source functions between numerical solutions 402 (unbolded line) and true solutions 404 (bolded line); and FIG. 4B illustrates a graph 450 of a comparison of the receiver functions between numerical solutions 452 (unbolded line) and true solutions 454 (bolded line) without any constraint. That is, the weight 165 for the receiver scaling factor key 150a is 50; the weight 165 for the source scaling factor key 150b is 50, the weight 165 for the common-depth point key 150c is 1e-3, and the weight 165 for the offset factor key 150d is 1e-3.

FIGS. 5A, 5B illustrate an example of a five key decomposition that additionally includes the receiver group key 150e (for example, generated by splitting the receivers into six groups). Specifically, FIG. 5A illustrates a graph 500 of a comparison of the source functions between numerical solutions 502 (unbolded line) and true solutions 504 (bolded line); and FIG. 5B illustrates a graph 550 of a comparison of the receiver functions between numerical solutions 552 (unbolded line) and true solutions 554 (bolded line) without any constraint. That is, the weight 165 for the receiver scaling factor key 150a is 50; the weight 165 for the source scaling factor key 150b is 50, the weight 165 for the common-depth point key 150c is 1e-3, the weight 165 for the offset factor key 150d is 1e-3, and the weight 165 for the receiver group key 150e is 1. As shown by this example, as the receiver group key 150e is weighted (or penalized), the numerical solution of the receiver function is closer to the true solution. Note that the numerical solution of the source function differs from the true solution as the source group key 150f is not constrained.

Figure 6A:
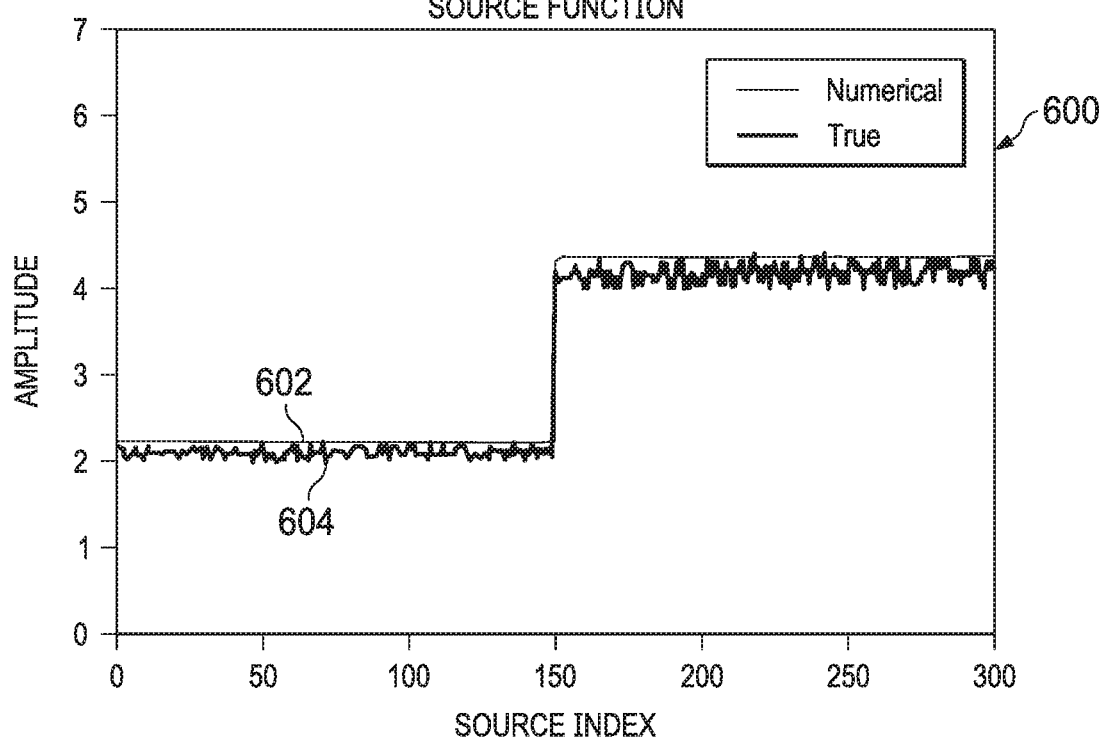
FIG. 6A illustrates a six key decomposition with respect to source functions, according to some implementations.
Figure 6B:
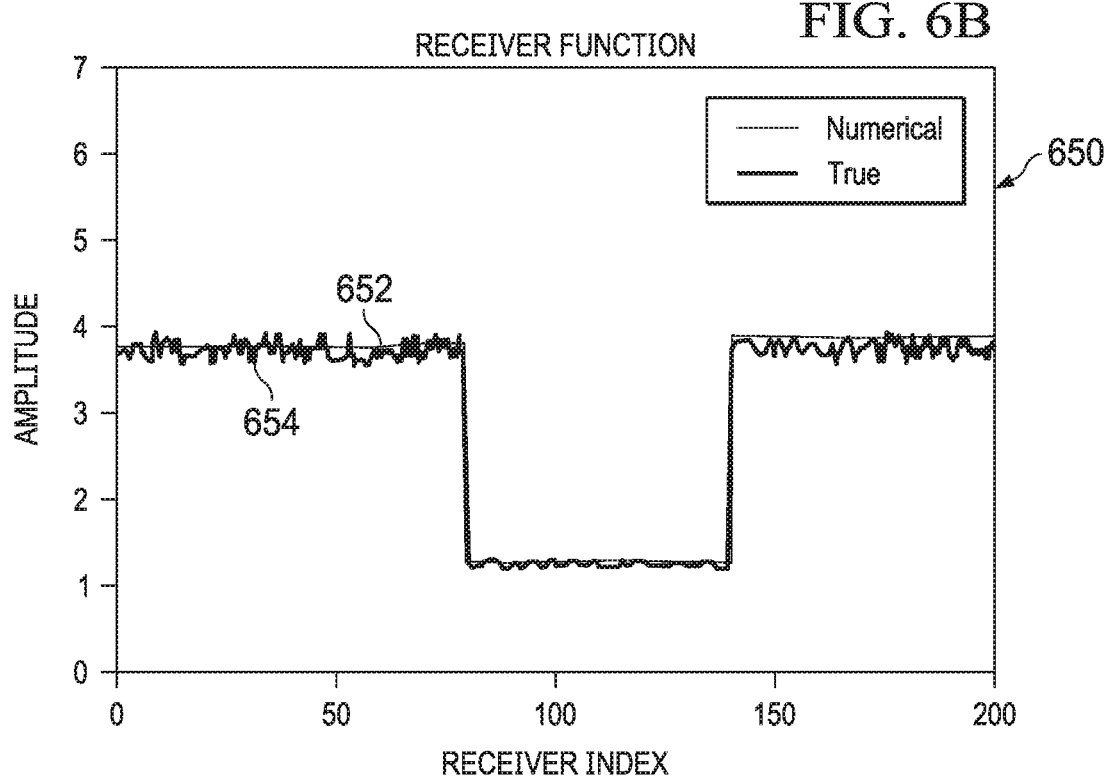
FIG. 6B illustrates a six key decomposition with respect to receiver functions, according to some implementations.

FIGS. 6A, 6B illustrate an example of a six key decomposition that additionally includes the source group key 150f and the receiver group key 150e. Specifically, FIG. 6A illustrates a graph 600 of a comparison of the source functions between numerical solutions 602 (unbolded line) and true solutions 604 (bolded line); and FIG. 6B illustrates a graph 650 of a comparison of the receiver functions between numerical solutions 652 (unbolded line) and true solutions 654 (bolded line) without any constraint. That is, the weight 165 for the receiver scaling factor key 150a is 50; the weight 165 for the source scaling factor key 150b is 50, the weight 165 for the common-depth point key 150c is 1e-3, the weight 165 for the offset factor key 150d is 1e-3, the weight 165 for the receiver group key 150e is 1, and the weight 165 for the source group key 150f is 1. As illustrated, both of the source and receiver functions are constrained with group keys 150e, 150f. Thus, the numerical solutions of the receiver and source functions follow closer to the true solutions.

Figure 7C:
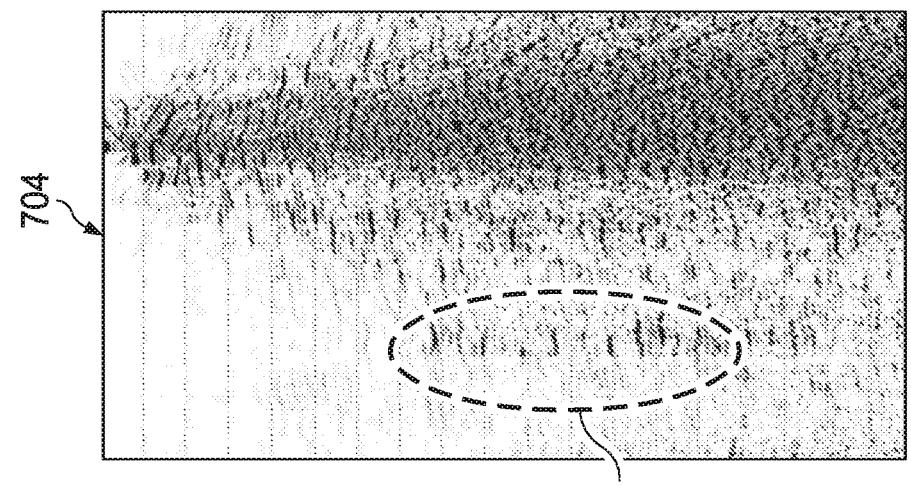
FIGS. 7A, 7B, 7C illustrate an input receiver gather and amplitude balancing, according to some implementations.
Figure 7B:
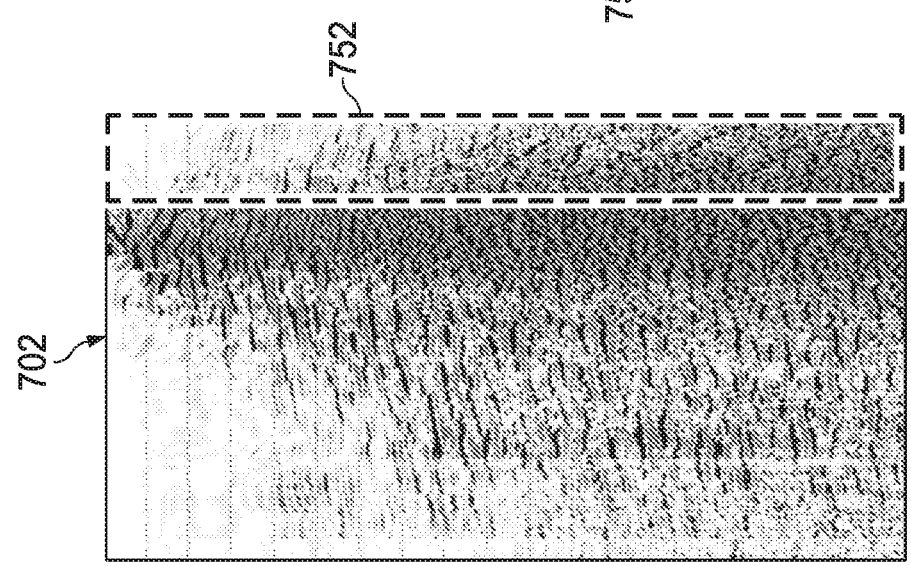
Figure 7A:
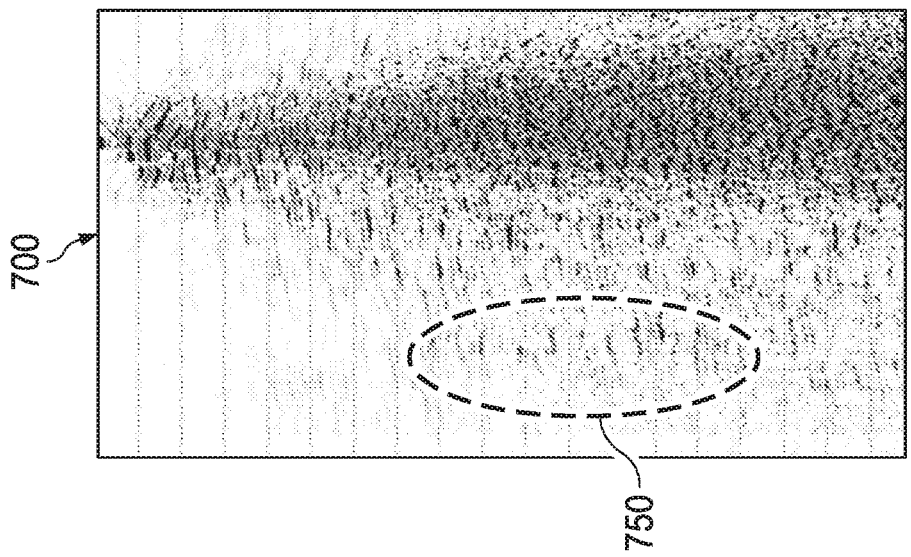

FIGS. 7A, 7B, 7C illustrate examples 700, 702, 704, respectively, of amplitude balancing, according to some implementations. Specifically, the amplitude balancing is performed on a dataset that is obtained over approximately one month and that includes approximately 100,000 surface shots, and 1,000 buried receivers. The receivers are arranged in a circular shape, and the sources are arranged in a circle centered about the receiver circle. A constant time window between 0.7 seconds and 1.7 seconds is used across the dataset. The computing device 102 can calculate the RMS amplitude within this time window for each trace to provide the input data for surface-consistent amplitude (SCA).

FIG. 7A illustrates a small portion of the receiver gather in order of shot number. Each trace in the gather is associated with a respective acquisition date. Thus, trace amplitudes can change abruptly due to source elevation or surface conditions changes, as shown by the portion of the receiver gather within ellipse 750. In an implementation, the computing device 102 can balance the seismic data to reduce such discontinuity in trace amplitude. In order to demonstrate a group key for the sources, traces that were collected during the middle 20 days of the 1 month are amplified by a factor of 2. FIG. 7B illustrates a modified receiver gather with the amplified traces. As shown in FIG. 7B, the traces that were collected during the middle 20 days of the 1 month (that is, the traces that are outside outline 752) are amplified. The amplitude balancing is then performed using five keys—the source scaling factor key 150b, the source group key 150f, the receiver scaling factor key 150a, the common-depth point key 150c, and the offset factor key 150d. The source groups are formed such that each group contains sources associated with the same acquisition date. FIG. 7C illustrates the receiver gather after amplitude balancing with the five keys. As shown by comparing the portion of the gather within ellipse 754 and the portion of the input gather within ellipse 750, the discontinuity of the amplitude balanced gather is much weaker than that of the input gather. Note that in FIG. 7C, the effect of amplification by two is removed and the overall amplitude is close to that of the original input gather of FIG. 7A.

Figure 8A:
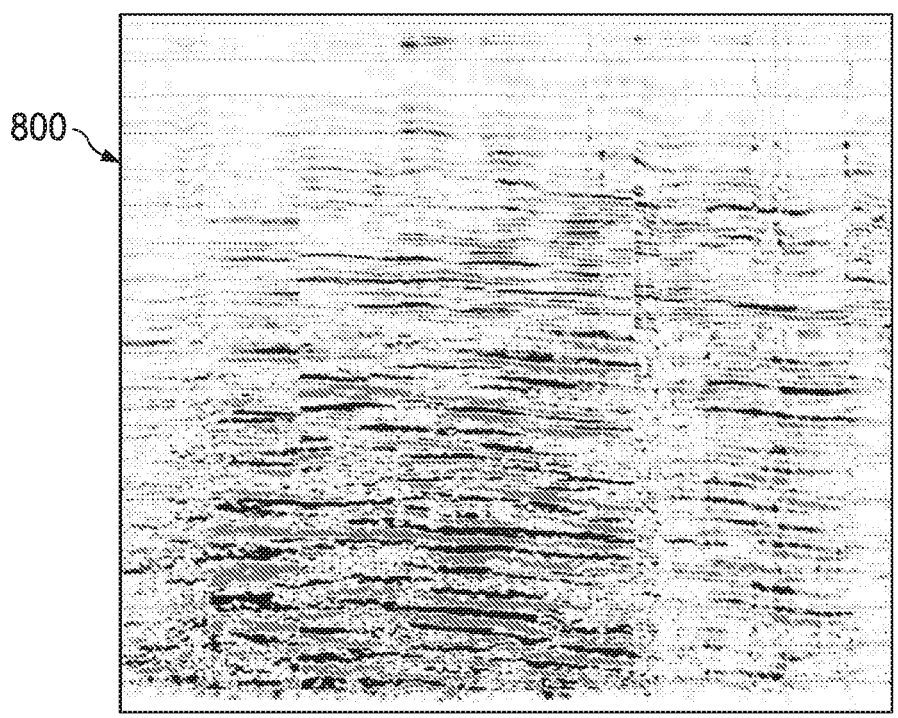
FIG. 8A, 8B illustrate a source group key on amplitude balancing, according to some implementations.
Figure 8B:
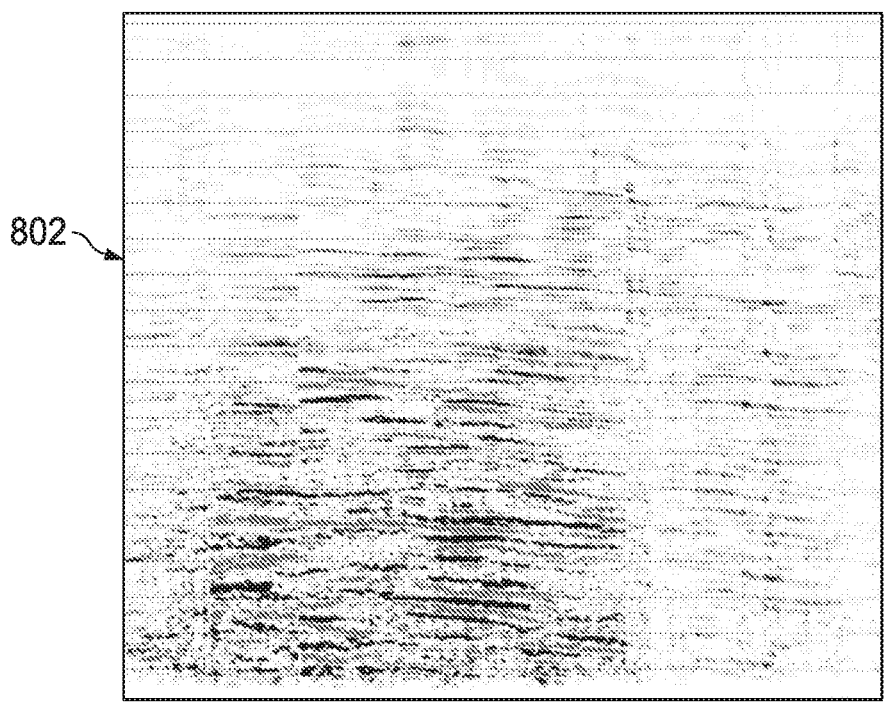

FIG. 8A illustrates an example 800 showing the results when a group key is used (for example, one of or both of keys 150e, 150f) for amplitude balancing compared to the example 802 of FIG. 8B that is generated without the group key.

Figure 9:
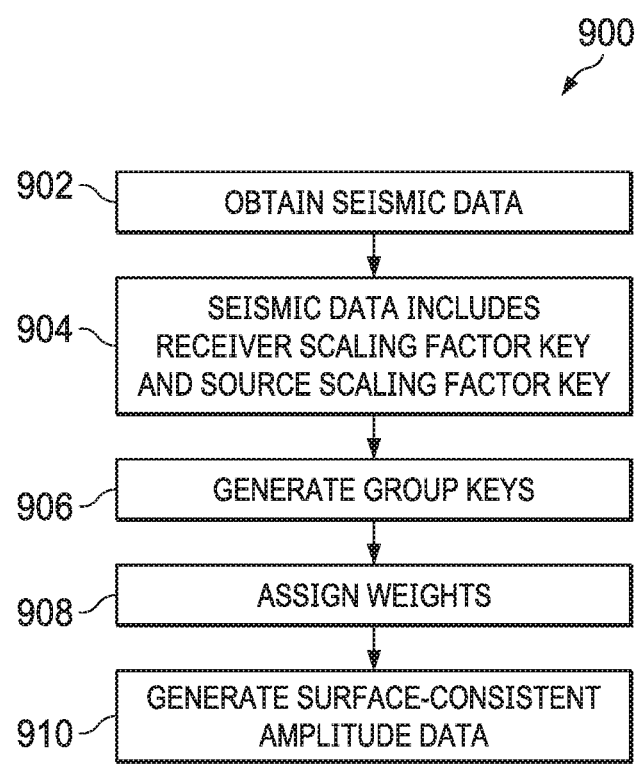
FIG. 9 illustrates a flowchart for surface consistent processing, according to some implementations.

FIG. 9 illustrates an example process 900 for surface consistent processing. The process 900 can be performed, for example, by the computing system 100, or another data processing apparatus. The process 900 can also be implemented as instructions stored on computer storage medium, and execution of the instructions by one or more data processing apparatus cause the one or more data processing apparatus to perform some or all of the operations of the process 900.

The computing device 102, obtains, for a plurality of traces, seismic data 120 that is associated with a plurality of sources and receivers (902). The computing device 102 can analyze the seismic data 120 to determine that the seismic data includes at least a receiver scaling factor key 150a, a source scaling factor key 150b, a common-depth point key 150c, and an offset factor key 150d (904). The computing device 102, in response to determining that the seismic data includes at least a receiver scaling factor key 150a, a source scaling factor key 150b, a common-depth point key 150c, and an offset factor key 150d, generates a receiver group key 150e, and a source group key 150f (906). The computing device 102 adds a respective weight 165 to each of the receiver scaling factor key 150a, the source scaling factor key 150b, the receiver group key 150e, the source group key 150f, the common-depth point key 150c, and the offset key 160d (908). The computing device 102 generates surface-consistent amplitude data 170 using a solution of the constrained linear system of equations and each scaling factors of the weighted-receiver scaling factor key 150a, the weighted-source scaling factor key 150b, the weighted-receiver group key 150e, the weighted-source group key 150f, the weighted-common-depth point key 150c, and the weighted-offset factor key 150d (910).

Figure 10:
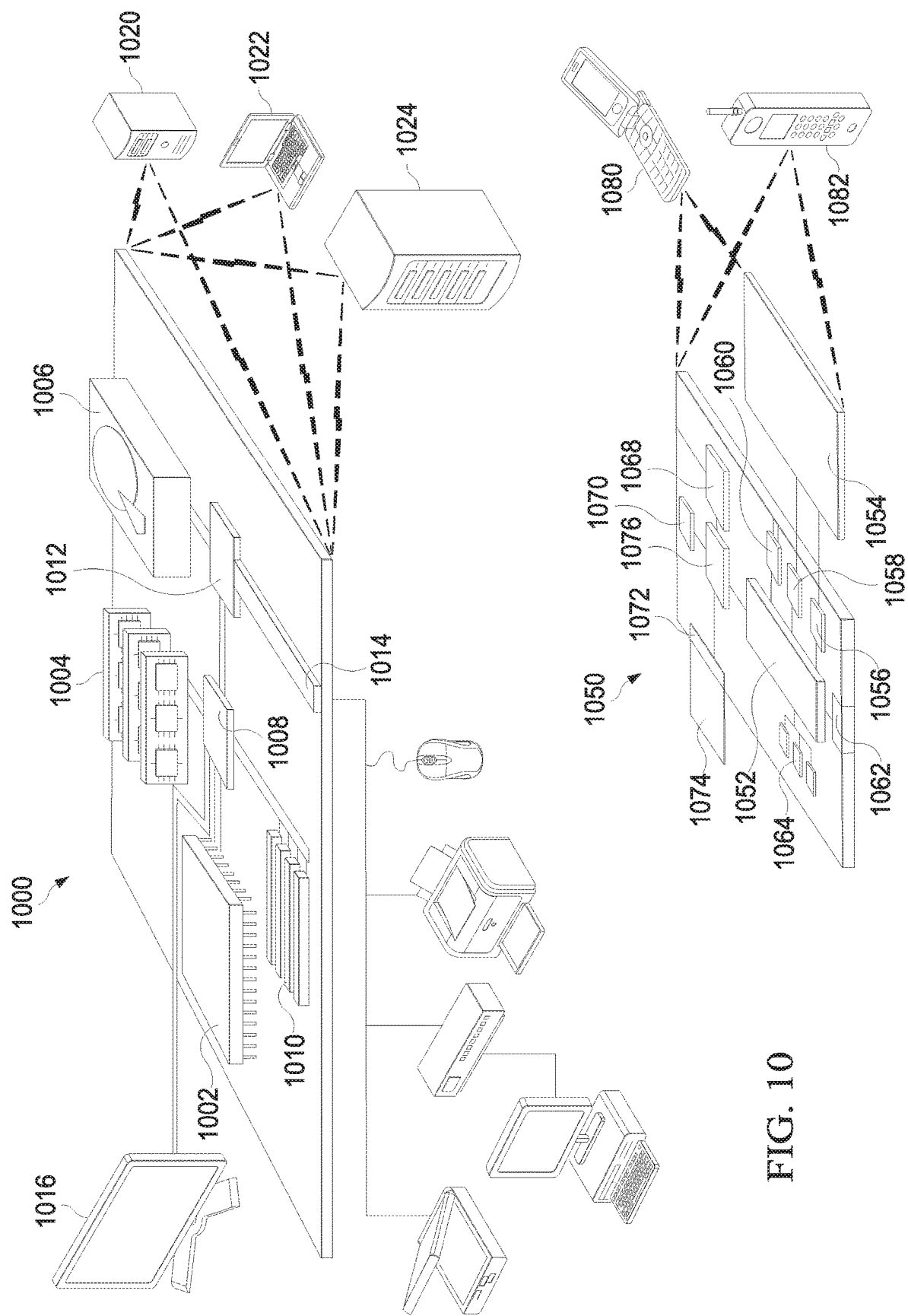
FIG. 10 illustrates an example computing environment for implementing the techniques described herein, according to some implementations.

FIG. 10 shows an example of a generic computing device 1000 and a generic mobile computing device 1050, which are used with the techniques described here. Computing device 1000 is intended to represent various forms of digital computers, such as laptops, desktops, workstations, personal digital assistants, servers, blade servers, mainframes, and other appropriate computers. Mobile computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and claimed in this document.

Computing device 1000 includes a processor 1002, memory 1004, a storage device 1006, a high-speed interface 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and are mounted on a common motherboard or in other manners as appropriate. The processor 1002 processes instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors, multiple buses, or both are used, as appropriate, along with multiple memories and types of memory. Also, multiple computing devices 1000 are connected, with each device providing portions of the necessary operations (for example, as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods. The information carrier is a computer- or machine-readable medium, such as the memory 1004, the storage device 1006, or a memory on processor 1002.

The high-speed interface 1008 manages bandwidth-intensive operations for the computing device 1000. The low-speed interface 1012 manages lower bandwidth-intensive operations. Such allocation of functions is exemplary only. In one implementation, the high-speed interface 1008 is coupled to memory 1004, display 1016 (for example, through a graphics processor or accelerator), and to high-speed expansion ports 1010, which accepts various expansion cards (not shown). In the implementation, low-speed interface 1012 is coupled to storage device 1006 and low-speed bus 1014. The low-speed expansion port, which may include various communication ports (for example, USB (Universal Serial Bus), Bluetooth, Ethernet, wireless Ethernet) may be coupled to one or more input/output devices, such as a keyboard, a pointing device, a scanner, or a networking device such as a switch or router, for example, through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as mobile computing device 1050. Each of such devices may contain one or more of computing device 1000, 1050, and an entire system may be made up of multiple computing devices 1000, 1050 communicating with each other.

Mobile computing device 1050 includes a processor 1052, memory 1064, an input/output device such as a display 1054, a communication interface 1076, and a transceiver 1068, among other components. The mobile computing device 1050 may also be provided with a storage device, such as a microdrive or other device, for additional storage. Each of the components 1050, 1052, 1064, 1054, 1060, and 1068, are interconnected using various buses, and several of the components may be mounted on a common motherboard or in other manners as appropriate.

The processor 1052 may execute instructions within the mobile computing device 1050, including instructions stored in the memory 1064. The processor may be implemented as a chipset of chips that include separate and multiple analog and digital processors. The processor may provide, for example, for coordination of the other components of the mobile computing device 1050, such as control of user interfaces, applications run by mobile computing device 1050, and wireless communication by mobile computing device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052.

In addition, an external interface 1062 may be provide in communication with processor 1052, so as to enable near area communication of mobile computing device 1050 with other devices. External interface 1062 may provide, for example, for wired communication in some implementations, or for wireless communication in other implementations, and multiple interfaces may also be used.

The memory 1064 stores information within the mobile computing device 1050. The memory 1064 may be implemented as one or more of a computer-readable medium or media, a volatile memory unit or units, or a non-volatile memory unit or units. Expansion memory 1074 may also be provided and connected to mobile computing device 1050 through an expansion interface 1072, which may include, for example, a SIMM (Single In Line Memory Module) card interface. Such expansion memory 1074 may provide extra storage space for mobile computing device 1050, or may also store applications or other information for mobile computing device 1050. Specifically, expansion memory 1074 may include instructions to carry out or supplement the processes described herein, and may include secure information also. Thus, for example, expansion memory 1074 may be provide as a security module for mobile computing device 1050, and may be programmed with instructions that permit secure use of mobile computing device 1050. In addition, secure applications may be provided via the SIMM cards, along with additional information, such as placing identifying information on the SIMM card in a non-hackable manner.

The memory may include, for example, flash memory, NVRAM memory, or both, as discussed below. In one implementation, a computer program product is tangibly embodied in an information carrier. The computer program product contains instructions that, when executed, perform one or more methods, such as those described herein. The information carrier is a computer- or machine-readable medium, such as the memory 1064, expansion memory 1074, memory on processor 1052, or a propagated signal that may be received, for example, over transceiver 1068 or external interface 1062.

Mobile computing device 1050 may communicate wirelessly through communication interface 1076, which may include digital signal processing circuitry where necessary. Communication interface 1076 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to mobile computing device 1050, which may be used as appropriate by applications running on mobile computing device 1050.

Mobile computing device 1050 may also communicate audibly using audio codec 1060, which may receive spoken information from a user and convert it to usable digital information. Audio codec 1060 may likewise generate audible sound for a user, such as through a speaker, for example, in a handset of mobile computing device 1050. Such sound may include sound from voice telephone calls, may include recorded sound (for example, voice messages, music files, etc.) and may also include sound generated by applications operating on mobile computing device 1050.

The mobile computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here may be realized in digital electronic circuitry, integrated circuitry, specially designed ASICs (application specific integrated circuits), computer hardware, firmware, software, or combinations thereof. These various implementations may include implementation in one or more computer programs that are executable and interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural, object-oriented programming language, or in assembly/machine language. As used herein, the terms "machine-readable medium" "computer-readable medium" refers to any computer program product, apparatus, or device (for example, magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions and data to a programmable processor.

To provide for interaction with a user, the systems and techniques described here may be implemented on a computer having a display device (for example, a CRT (cathode ray tube) or LCD (liquid crystal display) monitor) for displaying information to the user and a keyboard and a pointing device (for example, a mouse or a trackball) by which the user may provide input to the computer. Other kinds of devices may be used to provide for interaction with a user as well; for example, feedback provided to the user may be any form of sensory feedback (for example, visual feedback, auditory feedback, or tactile feedback); and input from the user may be received in any form, including acoustic, speech, or tactile input.

The systems and techniques described here may be implemented in a computing system that includes a back end component (for example, as a data server), or that includes a middleware component (for example, an application server), or that includes a front end component (for example, a client computer having a graphical user interface or a Web browser through which a user may interact with an implementation of the systems and techniques described here), or any combination of such back end, middleware, or front end components. The components of the system may be interconnected by any form or medium of digital data communication (for example, a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features described in this disclosure in the context of separate implementations can also be provided in combination in a single implementation. Conversely, various features that are described in the context of a single implementation can also be provided in multiple implementations separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

I claim:

1. A computer-implemented method, comprising:
   obtaining, for a plurality of traces, seismic signal amplitude data associated with a plurality of sources and receivers;
   determining that the signal amplitude data includes at least a receiver key and a source key;
   grouping the sources into disjointed source groups;
   grouping the receivers into disjointed receiver groups;
   in response to the determining, generating a receiver group key based on the disjointed receiver groups and a source group key based on the disjointed source groups;
   assigning a respective weight to each of the receiver key, the source key, the receiver group key, and the source group key; and
   generating surface-consistent amplitude data using surface-consistent amplitude processing and each of the weighted-receiver key, the weighted-source key, the weighted-receiver group key, and the weighted-source group key, wherein the surface-consistent amplitude data reduces long wavelength errors in the seismic signal amplitude data and leads to seismic images with higher resolution.

2. The method of claim 1, further comprising:
   determining that the signal amplitude data includes a common-depth point key and an offset key.

3. The method of claim 2, further comprising:
   assigning a respective weight to each of the common-depth point key and the offset key; and
   generating the surface consistent amplitude data using the surface-consistent amplitude processing and each of the weighted-receiver key, the weighted-source key, the weighted-receiver group key, the weighted-source group key, the weighted-common-depth point key, and the weighted-offset key.

4. The method of claim 3, wherein assigning the respective weights includes assigning each of the weights to each of the receiver key, the source key, the receiver group key, the source group key, the common-depth point key, and the offset key to balance an amplitude of the seismic data.

5. The method of claim 4, wherein the weight assigned to the source key is greater than the weight assigned to the source group key.

6. The method of claim 4, wherein the weight assigned to the receiver key is greater than the weight assigned to the receiver group key.

7. The method of claim 4, wherein both of the weight assigned to the source group key and the weight assigned to the receiver group key is greater than the weight assigned to the offset key.

8. The method of claim 4, wherein both of the weight assigned to the source group key and the weight assigned to the receiver group key is greater than the weight assigned to the common-depth point key.

9. A system, comprising:
one or more processors; and
a non-transitory computer-readable storage medium coupled to the one or more processors and storing programming instructions for execution by the one or more processors, the programming instructions instructing the one or more processors to perform operations comprising:
obtaining, for a plurality of traces, seismic signal amplitude data associated with a plurality of sources and receivers;
determining that the signal amplitude data includes at least a receiver key and a source key;
grouping the sources into disjointed source groups;
grouping the receivers into disjointed receiver groups;
in response to the determining, generating a receiver group key based on the disjointed receiver groups and a source group key based on the disjointed source groups;
assigning a respective weight to each of the receiver key, the source key, the receiver group key, and the source group key; and
generating surface-consistent amplitude data using surface-consistent amplitude processing and each of the weighted-receiver key, the weighted-source key, the weighted-receiver group key, and the weighted-source group key, wherein the surface-consistent amplitude data reduces long wavelength errors in the seismic signal amplitude data and leads to seismic images with higher resolution.

10. The system of claim 9, the operations further comprising determining that the signal amplitude data includes a common-depth point key and an offset key.

11. The system of claim 10, the operations further comprising:
assigning a respective weight to each of the common-depth point key and the offset key; and
generating the surface-consistent amplitude data using the surface-consistent amplitude processing and each of the weighted-receiver key, the weighted-source key, the weighted-receiver group key, the weighted-source group key, the weighted-common-depth point key, and the weighted-offset key.

12. The system of claim 11, wherein assigning the respective weights includes assigning each of the weights to each of the receiver key, the source key, the receiver group key, the source group key, the common-depth point key, and the offset key to balance an amplitude of the seismic data.

13. A non-transitory computer readable medium storing instructions to cause one or more processors to perform operations comprising:
obtaining, for a plurality of traces, seismic signal amplitude data associated with a plurality of sources and receivers;
determining that the signal amplitude data includes at least a receiver key and a source key;
grouping the sources into disjointed source groups;
grouping the receivers into disjointed receiver groups;
in response to the determining, generating a receiver group key based on the disjointed receiver groups and a source group key based on the disjointed source groups;
assigning a respective weight to each of the receiver key, the source key, the receiver group key, and the source group key; and
generating surface-consistent amplitude data using surface-consistent amplitude processing and each of the weighted-receiver key, the weighted-source key, the weighted-receiver group key, and the weighted-source group key, wherein the surface-consistent amplitude data reduces long wavelength errors in the seismic signal amplitude data and leads to seismic images with higher resolution.

14. The non-transitory computer readable medium of claim 13, the operations further comprising determining that the signal amplitude data includes a common-depth point key and an offset key.

15. The non-transitory computer readable medium of claim 14, the operations further comprising:
assigning a respective weight to each of the common-depth point key and the offset key; and
generating the surface-consistent amplitude data using the surface-consistent amplitude processing and each of the weighted-receiver key, the weighted-source key, the weighted-receiver group key, the weighted-source group key, the weighted-common-depth point key, and the weighted-offset key.

16. The non-transitory computer readable medium of claim 15, wherein assigning the respective weights includes assigning each of the weights to each of the receiver key, the source key, the receiver group key, the source group key, the common-depth point key, and the offset key to balance an amplitude of the seismic data.

* * * * *